Feb. 24, 1948. L. M. MEISENHELDER 2,436,443
SELF-DUMPING FARM WAGON
Filed March 7, 1947 2 Sheets-Sheet 1
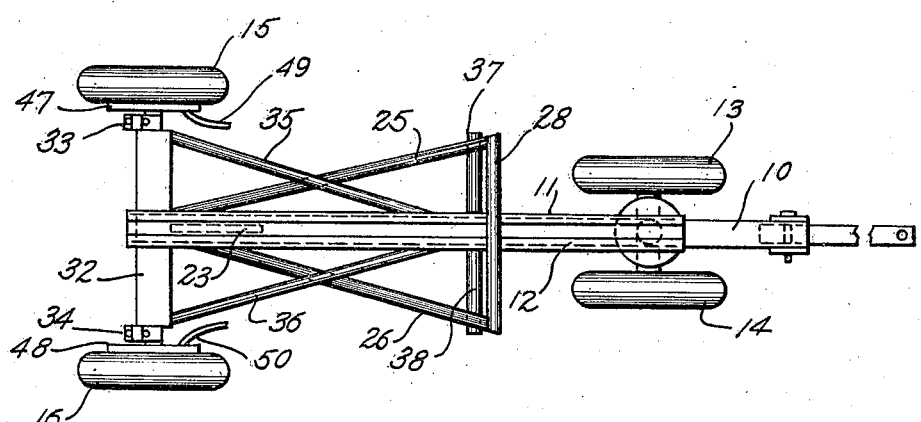
INVENTOR.
Louis M. Meisenhelder
BY
McMorrow, Berman & Davidson
Attorneys

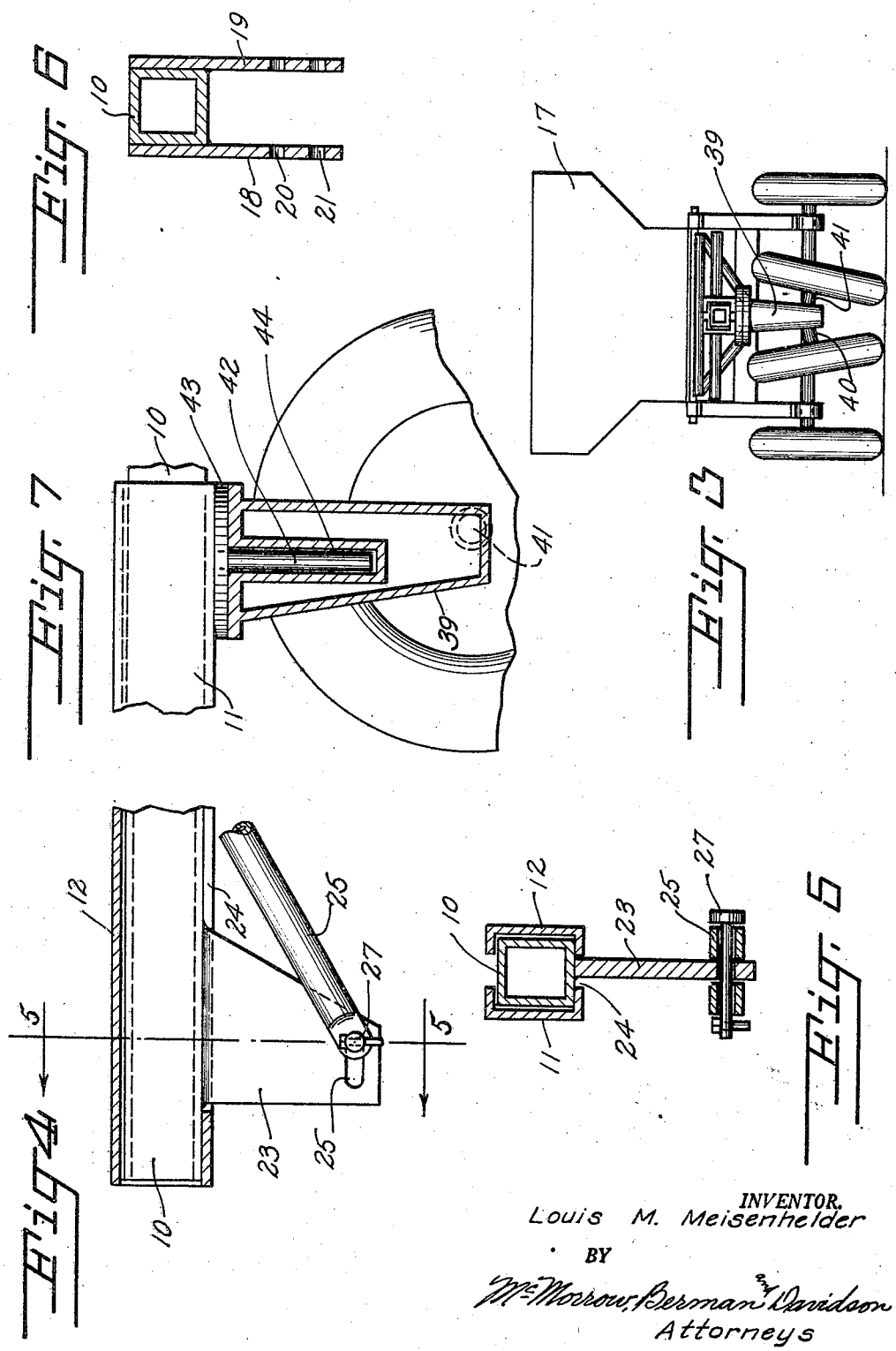

Patented Feb. 24, 1948

2,436,443

UNITED STATES PATENT OFFICE 2,436,443

SELF-DUMPING FARM WAGON

Louis M. Meisenhelder, Correctionville, Iowa

Application March 7, 1947, Serial No. 733,155

7 Claims. (Cl. 298—19)

This invention relates to farm wagons, including bodies mounted on front and rear wheels, and in particular includes means incorporated in the gear of the wagon for dumping the body with the wheels remaining in fixed positions.

The purpose of the invention is to provide means for dumping the body of a farm wagon by a forward pull on the tongue or bolster, with the wheels secured in fixed positions by brakes or the like.

Various devices have been provided for actuating the bodies of farm wagons, trailers, trucks, and the like, through jack-knifing action or hydraulic cylinders, but these require comparatively complicated and expensive operating instrumentalities, and in the common form of jack-knifing levers, wherein the wheels are drawn together, to dump the wagon, it is possible to dump the wagon accidentally, and this causes damage. With this thought in mind, this invention contemplates a farm wagon wherein the supporting gear or chassis is of rigid construction, and, incorporated therein, is a centrally disposed, longitudinally extending slidable beam with the end thereof connected by levers to the under surface of the body, wherein with the wheels locked, a forward pull on the beam will elevate the forward end of the body and with the rear portion of the body pivotally mounted on the chassis, the body will assume a dumping position.

The object of this invention is, therefore, to incorporate body-dumping actuating instrumentalities in the gear of a wagon, wherein with the wheels locked, a forward pull on the tongue will actuate the body of the wagon to dumping position.

Another object of the invention is to provide a self-dumping farm wagon wherein the body is actuated to dumping position without changing the relative positions of the wheels.

Another object of the invention is to provide jack-knifing dumping elements in combination with the gear of a wagon, wherein the dumping elements actuate independent of the framework of the gear.

Another object of the invention is to provide a self-dumping farm wagon in which the wagon may be used in the usual manner and only actuated to dumping position as required.

Another object of the invention is to provide a self-dumping farm wagon having stationary supporting wheel gear in which the front wheels are positioned ahead of the center of the king pin providing caster action.

Another object of the invention is to provide a self-dumping farm wagon wherein the dumping instrumentalities are of comparatively solid and rigid construction.

A further object of the invention is to provide a self-dumping farm wagon in which the wheels remain in their relative positions, which is of a simple and economical construction.

With these and other objects in view, the invention embodies a farm wagon having front and rear wheels with suitable framework or wagon gear supported by axles from the wheels, and in which the front wheels are pivotally mounted on a king pin, a wagon body hinged to the upper surface of the rear end of the gear, a tongue slidably mounted in the gear, and levers pivotally attached to the tongue and under surface of the wagon body, wherein forward motion of the tongue forces the forward ends of the levers and wagon body upward.

Other features and advantages of the invention will appear from the following description taken in connection with the drawings, wherein:

Figure 1 is a view showing a side elevation of the self-dumping farm wagon with the body and operating levers thereof also indicated in dotted lines.

Figure 2 is a plan view of the supporting framework or wagon gear taken on line 2—2 of Figure 1, with the body omitted.

Figure 3 is a view showing a front elevation looking toward the forward end of the wagon.

Figure 4 is a detail showing part of a longitudinal section through the center of the tongue at the rear end thereof with the forward end of the tongue and forward portion of one of the dumping levers broken away.

Figure 5 is a cross-section through the rear end of the dumping gear on line 5—5 of Figure 4, illustrating the downwardly extending arm to the lower end of which the body-dumping levers are pivotally attached through the slot as shown.

Figure 6 is a detail showing a section through the forward end of the tongue taken on line 6—6 of Figure 1.

Figure 7 is a detail showing a longitudinal section through the forward end of the wagon gear illustrating the mounting of the front wheels.

Referring now to the drawings, wherein like reference characters indicate corresponding parts, the self-dumping farm wagon of this invention includes a tongue 10 slidably mounted between channel-shaped elements 11 and 12 forming the main support element of the wagon gear, front wheels 13, and 14, rear wheels 15 and 16, and a wagon body 17.

The forward end of the tongue 10 is provided with depending side plates 18 and 19, with sockets 20 and 21 therein through which the wagon may be attached to a tractor hitch or bar 22. It will be understood, however, that the forward end of the tongue 10 may be provided with suitable connecting means so that the wagon may be drawn by horses or other power means. At the rear of the tongue is a downwardly extending arm 23 which extends through a slot 24 between the channel-shaped elements 11 and 12, and in the lower end of the arm 23 is a slot in which the downwardly extending ends of actuating levers 25 and 26 are pivotally mounted with the forward ends of the levers fixedly attached to a transversely disposed bar 28, as illustrated in Figure 2, and the bar is positioned against the under surface 29 of the wagon body. The lower surface of the wagon body is also provided with bearings 30 by which the body is pivotally mounted through a rod 31 on a beam 32 at the rear end of the supporting gear, wherein rod 31 is mounted through bearings 33 and 34 at the ends of the beam 32. The rear end of the wagon gear is supported by the side members 11 and 12 of the centrally disposed beam thereof through diagonal braces 35 and 36, and the members 11 and 12 are also provided with outwardly extending pins 37 and 38, upon which the ends of the levers 25 and 26 rest, as illustrated in Figure 1.

The front wheels 13 and 14 of the wagon are supported in a centrally disposed member 39 through axles 40 and 41, with the centers of the axles 40 and 41 positioned ahead of the center of a king pin 42 extending downward from a flange 43 on the under surface of the central beam of the gear and into a socket 44 in the supporting member 39. The rear wheels 15 and 16 are mounted on an axle 45 in downwardly extending elements 46, and the wheels may be provided with suitable brake drums 47 and 48 which may be connected by tubes 49 and 50 to any suitable source of fluid pressure for actuation of the brakes.

With the parts arranged in this manner, it will be noted that the wagon may be used in the usual manner without danger of the body dumping as the body will remain in the normal position, as illustrated by the full lines in Figure 1, until the brakes are applied to the rear wheels. When the brakes are applied to the rear wheels, a forward pull on the tongue 10 will draw the depending arm 23 forward at the rear end of the tongue, and as this arm moves from the position shown in full lines in Figure 1 to the position indicated in dotted lines, the rod 28 at the forward ends of the levers will be forced upward by the pins 37 and 38 upon which the under surfaces of the levers 25 and 26 slide, and as the rod 28 moves upward, the forward end of the body of the wagon will move upward about the rod 31 of the hinge, thereby dumping products therein. After products are dumped from the body of the wagon, the brakes may be released and the weight of the body will move the rod 28 downward, drawing the tongue 10 backward to the normal position as illustrated in full lines in Figure 1.

It will be understood that the dumping gear of this invention may be used in combination with a wagon body of any other type or design, and other modifications may be made in the parts without departing from the spirit of the invention.

What is claimed is:

1. In a wagon having a body mounted on front and rear wheels through suitable supporting gear, a hinge pivotally attaching the rear portion of the body to the rear end of the gear, a tongue slidably mounted and longitudinally disposed in the gear, said tongue having a downwardly extending arm at the rear end, a transversely disposed bar on the upper surface of the gear, levers pivotally connecting the arm extending downward from the rear end of the tongue to the transversely disposed bar, said transversely disposed bar positioned below the under surface of the wagon body, and fulcrum elements on the gear upon which the levers are slidably mounted.

2. In a wagon having a body mounted through supporting gear on front and rear wheels, means hinging the rear portion of the body to the rear end of the gear, said gear including a centrally disposed longitudinally extending channel-shaped element, a tongue slidably mounted in said channel-shaped element, said tongue having attaching means at the forward end and a depending arm at the rear end, a transversely disposed bar between the upper surface of the gear and lower surface of the body, and actuating levers connecting the depending arm of the tongue to the transversely disposed bar, said gear having fulcrum elements positioned below the actuating levers wherein forward movement of the depending arm causes the forward ends of the actuating levers and transversely disposed bar to travel upward elevating the forward end of the wagon body.

3. In a self-dumping farm wagon, the combination, which comprises wagon gear having a longitudinally extending, centrally disposed channel-shaped beam, wheels at the forward end of the gear rotatably mounted on axles with the centers of the axles positioned at slight angles in relation to a horizontal plane, a king pin mounting the front wheels on the gear the center of which is positioned behind the centers of the axles of the front wheels, rear wheels rotatably mounted on an axle in brackets extending downward from the rear of the gear, a tongue slidably mounted in said centrally disposed beam of the gear having connecting means at the forward end and a downwardly extending arm at the rear, a transversely disposed bar positioned on the upper surface of the gear, levers connecting said transversely disposed bar to the downwardly extending arm of the tongue, said gear having fulcrum elements positioned to contact the under surfaces of the levers, a wagon body with the forward end resting upon said transversely disposed bar, and means hinging the rear portion of the wagon body to the rear end of the wagon gear.

4. In a self-dumping farm wagon, the combination, which comprises wagon gear having front and rear wheels with a longitudinally extending centrally disposed channel-shaped beam, a tongue having a downwardly extending arm at the rear slidably mounted in said beam, a transversely disposed bar positioned across the upper surface of the gear, levers connecting the transversely disposed bar to the downwardly extending arm of the tongue through an elongated slot, fulcrum elements on the gear positioned to contact the lower surfaces of the levers, a wagon body positioned on the wagon gear with the forward end resting upon said transversely disposed bar, and means hinging the rear portion of the wagon body to the rear end of the gear.

5. In a self-dumping farm wagon, the combination, which comprises wagon gear having front and rear wheels with a longitudinally extending centrally disposed channel-shaped beam, a tongue having a downwardly extending arm at the rear slidably mounted in said beam, a transversely disposed bar positioned across the upper surface of the gear, levers connecting the transversely disposed bar to the downwardly extending arm of the tongue through an elongated slot, fulcrum elements on the gear positioned to contact the lower surfaces of the levers, a wagon body positioned on the wagon gear with the forward end resting upon said transversely disposed bar, means hinging the rear portion of the wagon body to the rear end of the gear, and means attaching the front wheels of the wagon to the gear with a caster mounting.

6. In a self-dumping farm wagon, the combination, which comprises wagon gear having front and rear wheels with a longitudinally extending centrally disposed channel-shaped beam, a tongue having a downwardly extending arm at the rear slidably mounted in said beam, a transversely disposed bar positioned across the upper surface of the gear, levers connecting the transversely disposed bar to the downwardly extending arm of the tongue through an elongated slot, fulcrum elements on the gear positioned to contact the lower surfaces of the levers, a wagon body positioned on the wagon gear with the forward end resting upon said transversely disposed bar, means hinging the rear portion of the wagon body to the rear end of the gear, a king pin pivotally connecting the front wheels of the wagon gear to the forward end of the centrally disposed beam, and brackets held by the king pin in which the front wheels are rotatably mounted wherein the mounting means of the wheels is positioned ahead of the center of the king pin.

7. In a self-dumping farm wagon, the combination, which comprises wagon gear having front and rear wheels with a longitudinally extending centrally disposed channel-shaped beam, a tongue having a downwardly extending arm at the rear slidably mounted in said beam, a transversely disposed bar positioned across the upper surface of the gear, levers connecting the transversely disposed bar to the downwardly extending arm of the tongue through an elongated slot, fulcrum elements on the gear positioned to contact the lower surfaces of the levers, a wagon body positioned on the wagon gear with the forward end resting upon said transversely disposed bar, means hinging the rear portion of the wagon body to the rear end of the gear, and brakes locking the rear wheels of the wagon gear.

LOUIS M. MEISENHELDER.